United States Patent [19]
Marsh et al.

[11] Patent Number: 5,347,088
[45] Date of Patent: Sep. 13, 1994

[54] ELECTRICAL JUNCTION BOX

[75] Inventors: Thomas R. Marsh, High Point; Carl R. Porter, Shelby, both of N.C.

[73] Assignees: Tenn-Tex Plastics, Inc., Kernersville; Specialty Lighting, Shelby, both of N.C.

[21] Appl. No.: 949,386

[22] Filed: Sep. 22, 1992

[51] Int. Cl.⁵ ............................................. H05K 5/00
[52] U.S. Cl. .................... 174/50; 220/4.02; 220/4.24
[58] Field of Search ............... 174/50, 52.1; 220/3.92, 220/3.94, 4.02, 4.24

[56] References Cited

U.S. PATENT DOCUMENTS

| | | | |
|---|---|---|---|
| D. 260,090 | 8/1981 | Hughes et al. | D16/03 |
| 3,168,613 | 2/1965 | Palmer | 174/65 R |
| 3,360,152 | 12/1967 | Leers | 220/4.24 |
| 3,630,406 | 12/1971 | Hammes | 220/3.3 |
| 4,173,286 | 11/1979 | Stanko | 220/4.24 X |
| 4,247,738 | 1/1981 | Bonato | 174/53 |
| 4,428,492 | 1/1984 | Jorgensen | 220/3.94 |
| 4,741,434 | 5/1988 | Liebman | 220/4.24 X |
| 4,979,616 | 12/1990 | Clanton | 220/4.24 X |

Primary Examiner—Leo P. Picard
Assistant Examiner—David Tone
Attorney, Agent, or Firm—Shefte, Pinckney & Sawyer

[57] ABSTRACT

An electrical junction box is formed of two identical, oppositely facing, and reversed members. Each member comprises a base, a plurality of peripheral walls extending from the base which are joined at adjacent ends thereof to form an open interior in the member. The walls of each member extend towards and engage the walls of the other member. Two of the plurality of walls of each member are oppositely disposed with one of the two walls having a projection extending in the direction of the other member and the other of the two walls having a recess disposed for receipt of the projection from the one wall of the other member in positioning the members together with facing interiors forming a closed junction box interior. At least one of the walls, and preferably a wall different from the walls bearing the projection or recess, may have a first aperture for use in mounting the box to a surface, the at least one aperture being located substantially away from the ends of the at least one wall and aligned with a corresponding aperture in a wall of the other member. The base may have a second aperture interiorly of the walls for receiving electrical wiring therethrough into the interior. A device for attaching the members together is also disclosed.

19 Claims, 3 Drawing Sheets

ELECTRICAL JUNCTION BOX

FIELD OF THE INVENTION

This invention relates to electrical installations and, more particularly, to electrical junction boxes.

BACKGROUND OF THE INVENTION

Many types of electrical junction boxes have been provided for connection to a surface. These boxes provide electrical connection from an electrical conduit to a junction carried within the box structure.

Existing junction boxes present a number of problems to the industry. First, existing boxes consist of at least two different parts requiring two different molds with the associated expense of manufacturing of the boxes. Second, the boxes have been equipped only with apertures for securing the box to a surface at the corners of the box structure. Placement of the apertures in the corners of the box makes it difficult to mount the boxes in areas such as the underside corner of a table, chair, or cabinet when the box is to be attached to an article of furniture.

A number of junction boxes exhibiting these problems can be found in U.S. Pat. Nos. 3,630,406 to Hammes; 4,428,492 to Jorgensen; 4,247,738 to Bonato; and Des. 260,090 to Hughes et al. Each of these patents require a number of separately manufactured parts and are difficult to install.

SUMMARY OF THE INVENTION

It is therefore an object of the present invention to provide for an electrical junction box which is easy and inexpensive to fabricate and install.

These and other objects of the present invention are accomplished with an electrical junction box formed of two identical, oppositely facing and reversed members, each member comprising a base, a plurality of peripheral walls extending from the base and joined at their adjacent ends thereof to form an open interior in the member, the walls of each member extending toward and engaging the walls of the other member. Two of the plurality of walls of each member are oppositely disposed with one of the two walls having a projection extending in the direction of the other member and the other of the two walls having a recess disposed for receipt of the projection from the one wall of the other member in positioning the members together with facing interiors forming a closed junction box interior. The electrical junction box may also contain at least one first aperture on at least one of the walls for use in mounting the box to a surface. The at least one first aperture is located away from any of the corners and is aligned with a corresponding aperture in a wall of the other member. The first aperture may be located in a wall different from said walls bearing said projections and recesses. One or both of said members may have a second aperture in said base for bolting the electrical switch to the box. The members may have devices adjacent the end of the walls for attaching the members together before mounting to a surface. These devices may be apertures through which the screws are threaded.

The members preferably are formed with four walls, a first two of the four walls of each member oppositely disposed with one of the two walls having a projection extending in the direction of the other member and the other of the two walls having a recess disposed for receipt of the projection from the one wall of the other member to position the members together with facing interiors forming a closed junction box interior. A second of the two of the four walls is perpendicular to the first two walls and has the mounting apertures formed centrally thereon.

DESCRIPTION OF THE PREFERRED EMBODIMENT

Figure 1:
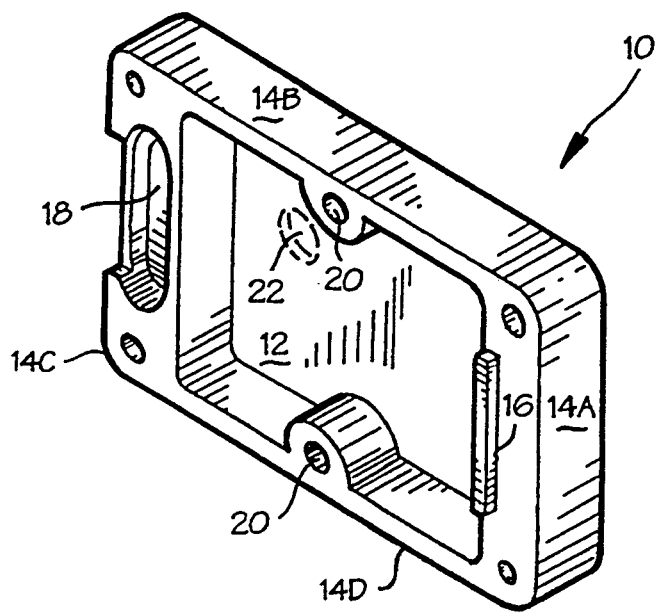
FIG. 1 is a perspective view of one of the identical a members of the junction box of the present invention.

Referring now to FIG. 1, one of two identical members 10, two of which comprise the electrical junction box of the present invention, is shown. The electrical junction box is preferably formed of plastic, but may be formed of other suitable nonconductive materials. The member shown in FIG. 1 comprises a base 12, which may be of a rectangular or other shape. The member 10 also has four peripheral walls 14A, B, C, and D extending from the base 12 which are joined at their ends to form an open interior in the member 10. One of the end walls 14A of each member 10 contains a projection 16 extending outwardly to be located in the direction in which the second member of the junction box will attach to the first member. Another end wall 14C oppositely disposed to the end wall bearing the projection 16 has a recess 18 disposed for receipt of the projection 16 from the second member in order to position the two members together with facing interiors forming a closed junction box interior.

Figure 2:
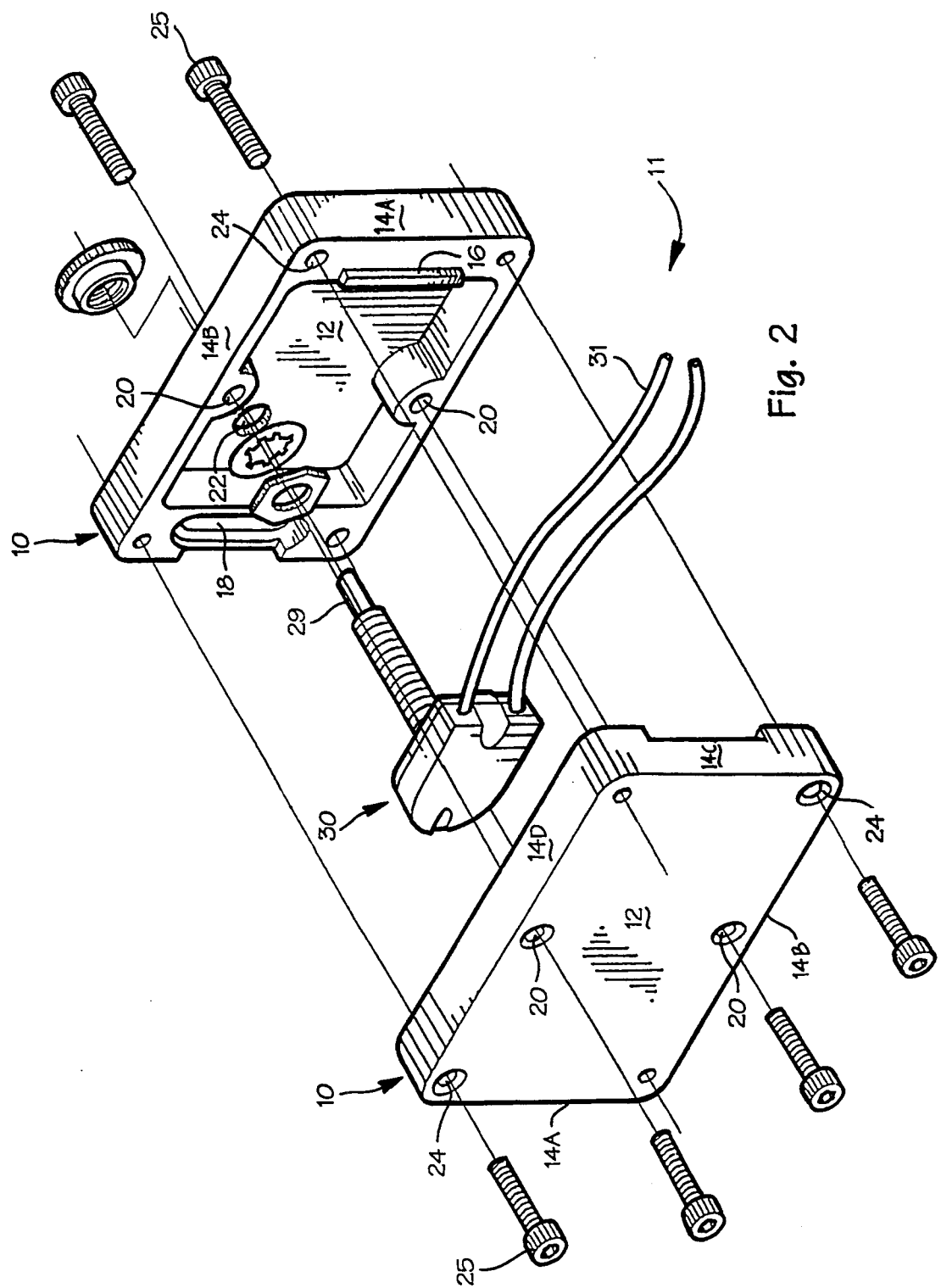
FIG. 2 is an exploded view of an electrical junction box made with members identical to the member of FIG. 1.

At least one of the walls, side walls 14B and 14D in FIGS. 1 and 2, may have at least one first aperture 20 which is used in mounting the box to a surface. The aperture 20 is preferably located substantially away from the ends of the walls 14B and 14D and most preferably in the center of the wall. This aperture should be aligned with a corresponding aperture 20 in a side wall of the other member. Additionally, the base may contain at least one second aperture 22 interiorly of the walls 14A, B, C, and D for receiving electrical wiring therethrough into the interior.

Referring now to FIG. 2, an exploded view of an electrical junction box assembly 11 is shown. The electrical junction box is assembled by joining two identical members 10 around an electrical connection or switch 30 having wire leads 31 and a leg portion 29. The electrical connection 30 may be secured to one of the identical members 10 via aperture 22 through which a portion 29 of the connection 30 is placed and which is typically affixed to the base with a nut and bolt. This also stabilizes the connection 30 within the electrical junction box 11. Once the electrical connection 30 is secured to one of the members 10, the two identical members 10 are secured together via counterbore holes 24 through which screws 25 are threaded. Once the two identical members 10 are secured together, the box 11 may be mounted to a surface via at least one aperture 20 which is located away from the corners of the members 10. By locating the at least one aperture 20 away from the corners, it is easier to mount the electrical junction box 11 in confined areas where corner mounting can be difficult such as the underside corner of a table or chair.

Figure 3:
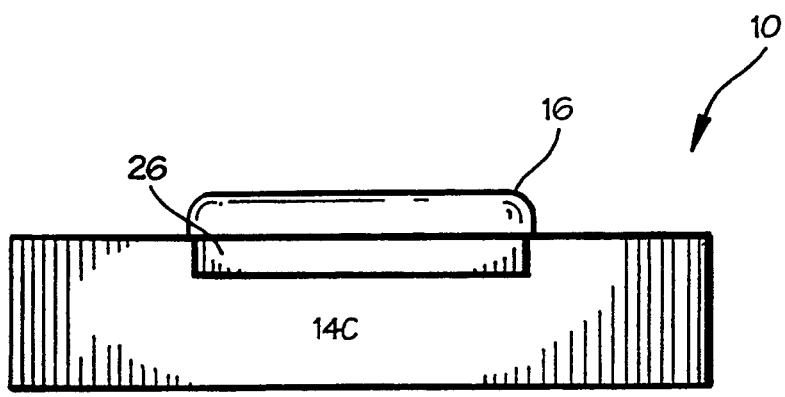
FIG. 3 is an end view of the member of FIG. 1.
Figure 4:
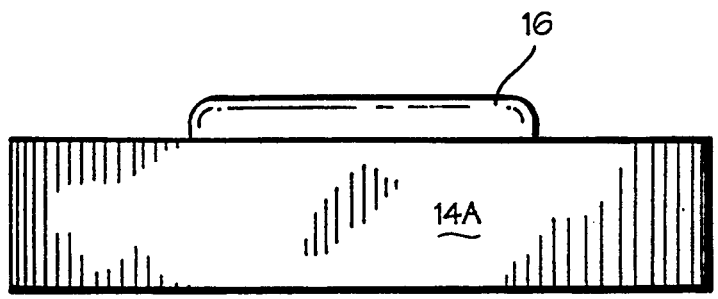
FIG. 4 is an end view of the member of FIG. 1 as viewed opposite the end illustrated in FIG. 3.
Figure 6:
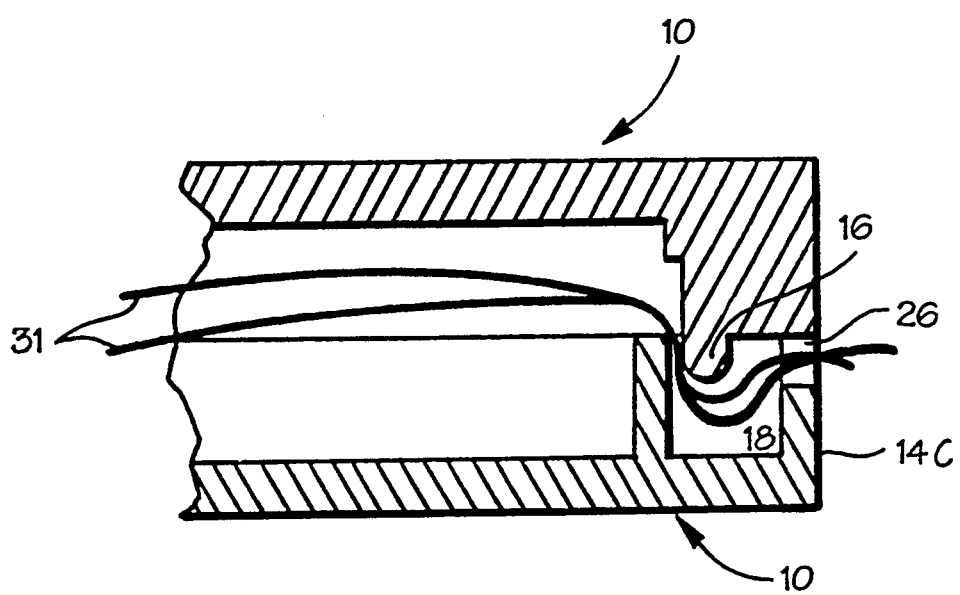
FIG. 6 is a plan sectional view along lines 6—6 of FIG. 5.

Referring now to FIG. 3, an end elevational view of a member 10 is shown from the end wall 14C of the member 10 bearing the recess 18. As can be seen in FIGS. 1, 2, and 3, recess 18 is constructed so as to provide a cutaway portion 26 in end wall 14C. Referring now to FIG. 4, an end elevational view of the end wall 14A bearing projection 16 is shown. Projection 16 should be of a height which is smaller than the depth of recess 18 by an amount to allow the wire leads to exit the box 11 as best seen in FIG. 6.

Figure 5:
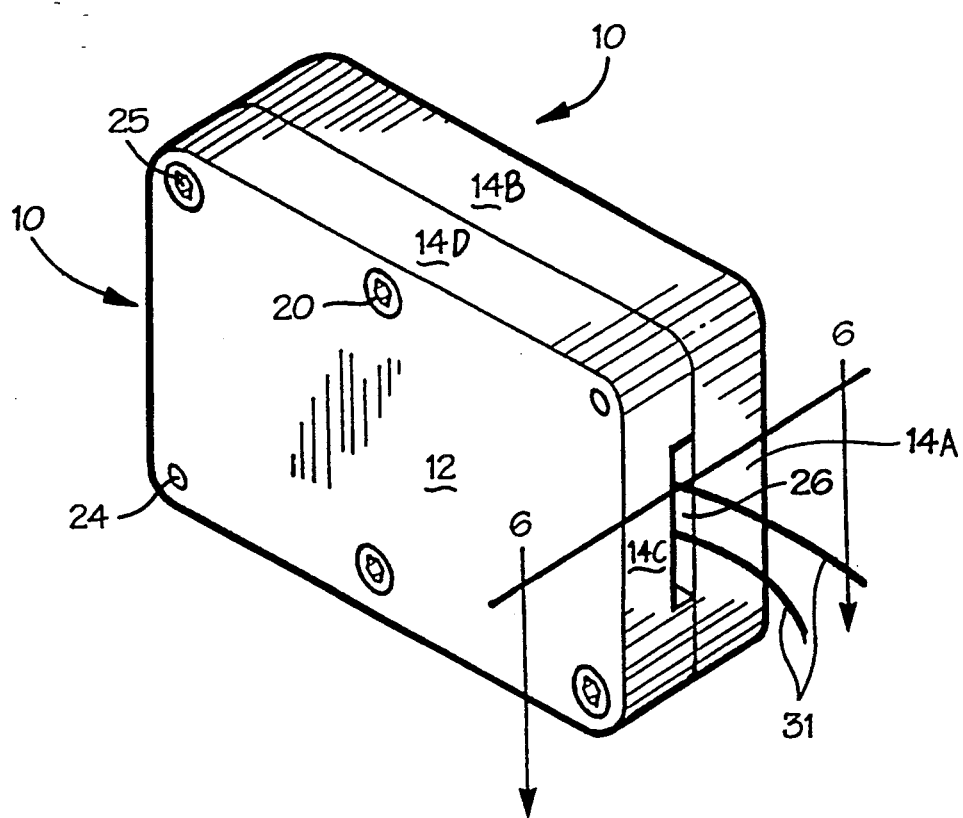
FIG. 5 is a perspective view of the electrical junction box of the present invention.

Referring now to FIG. 5, a perspective view of two members 10 connected together to form an electrical junction box 11 is shown. The members 10 are connected via counterbore holes 24 through which screws 25 seen in FIG. 2 are threaded. The wire leads 31 of electrical switch exit the box 11 via cutaway 26 of end wall 14C. A side elevational sectional view along lines 6—6 of FIG. 5 is seen in FIG. 6. Here, the projection 16 can be seen disposed within the recess 18 and providing a path for wire leads 31 of electrical switch 30 around projection 16 and through cutaway 26 of end wall 14C in order to secure the leads 31 and guide the leads' exit from the electrical junction box.

In summary, an electrical junction box formed of two identical members is disclosed which has the decided advantage of being formed from a common mold, as well as being assembled from common parts. Further, the box is easily mounted even in difficult to access locations.

It will be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An electrical junction box formed of two identical, oppositely facing, and reversed members, each member comprising:
    a base;
    a plurality of peripheral walls extending from said base and joined at their adjacent ends to form an open interior in said member;
    the walls of each member extending toward and engaging the walls of the other member; and
    two of said plurality of walls of each member being oppositely disposed with one of said two walls having a projection extending in the direction of the other member and the other of said two walls having a recess disposed for receipt of at least one wire lead and the projection from said one wall of the other member in positioning the members together with facing interiors forming a closed junction box interior, said projection and said recess forming a pathway to accommodate and secure leads exiting the junction box.

2. An electrical junction box according to claim 1 wherein at least one of said walls of each member has at least one first aperture for use in mounting the box to a surface, said at least one aperture being located substantially away from the ends of said at least one wall and aligned with a corresponding aperture in a wall of the other member.

3. An electrical junction box according to claim 2 wherein at least one said member has a second aperture in said base interiorly of said walls for receiving electrical wiring therethrough into said interior.

4. An electrical junction box according to claim 3 further comprising means adjacent said ends of said walls for attaching said members together before mounting to a surface.

5. An electrical junction box according to claim 2 wherein said at least one first aperture is located in a central location of said wall.

6. An electrical junction box according to claim 2 wherein said at least one first aperture is located in a wall different from said walls bearing said projections and recesses.

7. An electrical junction box formed of two identical, oppositely facing, and reversed members, each member comprising:
    a base;
    four peripheral walls extending perpendicular from said base and joined at their adjacent ends thereof to form an open interior in said member;
    said four walls of each member extending toward and engaging the walls of the other member
    a first two of said four walls of each member being oppositely disposed with one of said two walls having a projection extending in the direction of the other member and the other of said two walls having a recess disposed for receipt of at least one wire lead and the projection from said one wall of the other member in positioning the members together with facing interiors forming a closed junction box interior, said projection and said recess forming a pathway to accommodate and secure said at least one wire lead within the junction box; and
    a second two of said four walls being oppositely disposed and perpendicular to said first two walls.

8. An electrical junction box according to claim 7 wherein the base and at least one of said walls of each member has at least one first aperture for use in mounting the box to a surface, said at least one aperture being located substantially away from the ends of said at least one wall and aligned with a corresponding aperture in a wall of the other member.

9. An electrical junction box according to claim 8 wherein at least one said member has a second aperture in said base interiorly of said walls for receiving electrical wiring therethrough into said interior.

10. An electrical junction box according to claim 9 wherein said at least one first aperture is located in a central location of said wall.

11. An electrical junction box according to claim 8 further comprising means at corners of said base for attaching members together prior to mounting said members to a surface.

12. An electrical junction box formed of two identical, oppositely facing, and reversed members, each member comprising:
   a base;
   a plurality of peripheral walls extending from said base and joined at their adjacent ends to form an open interior in said member;
   at least one first aperture on at least one of said walls for use in mounting the box to a surface, said at least one aperture being located substantially away from the ends of said at least one wall and aligned with a corresponding aperture in a wall of the other member;
   a second aperture on at least one member in said base interiorly of said walls for receiving electrical wiring therethrough into said interior;
   the walls of each member extending toward and engaging the walls of the other member; and
   two of said plurality of walls of each member being oppositely disposed with one of said two walls having a projection extending in the direction of the other member and the other of said two walls having a recess disposed for receipt of at least one wire lead and the projection from said one wall of the other member in positioning the members together with facing interiors forming a closed junction box interior, said projection and said recess forming a pathway to accommodate and secure said at least one lead within the junction box.

13. An electrical junction box according to claim 12 wherein said at least one first aperture is located in a central location of said wall.

14. An electrical junction box according to claim 12 wherein said at least one first aperture is located in a wall different from said walls bearing said projections and recesses.

15. An electrical junction box according to claim 12 further comprising means adjacent said ends of said walls for attaching said members together before mounting to a surface.

16. An electrical junction box formed of two identical, oppositely facing, and reversed members, each member comprising:
   a base;
   four peripheral walls extending perpendicular from said base and joined at their adjacent ends thereof to form an open interior in said member;
   said four walls of each member extending toward and engaging the walls of the other member;
   at least one first aperture on at least one of said walls for use in mounting the box to a surface, said at least one aperture being located substantially away from the ends of said at least one wall and aligned with a corresponding aperture in a wall of the other member;
   a first two of said four walls of each member being oppositely disposed with one of said two walls having a projection extending in the direction of the other member and the other of said two walls having a recess disposed for receipt of at least one wire lead and the projection from said one wall of the other member in positioning the members together with facing interiors forming a closed junction box interior, said projection and said recess forming a pathway to accommodate and secure leads entering and exiting the junction box; and
   a second two of said four walls being oppositely disposed and perpendicular to said first two walls.

17. An electrical junction box according to claim 16 wherein at least one said member has a second aperture in said base interiorly of said walls for receiving electrical wiring therethrough into said interior.

18. An electrical junction box according to claim 17 wherein said at least one first aperture is located in a central location of said wall.

19. An electrical junction box according to claim 16 further comprising means at corners of said base for attaching members together prior to mounting said members to a surface.

* * * * *